July 1, 1930.  E. H. ROLLINSON  1,769,312
PLUNGER TYPE ELECTRIC BELL
Filed April 23, 1928  2 Sheets-Sheet 1
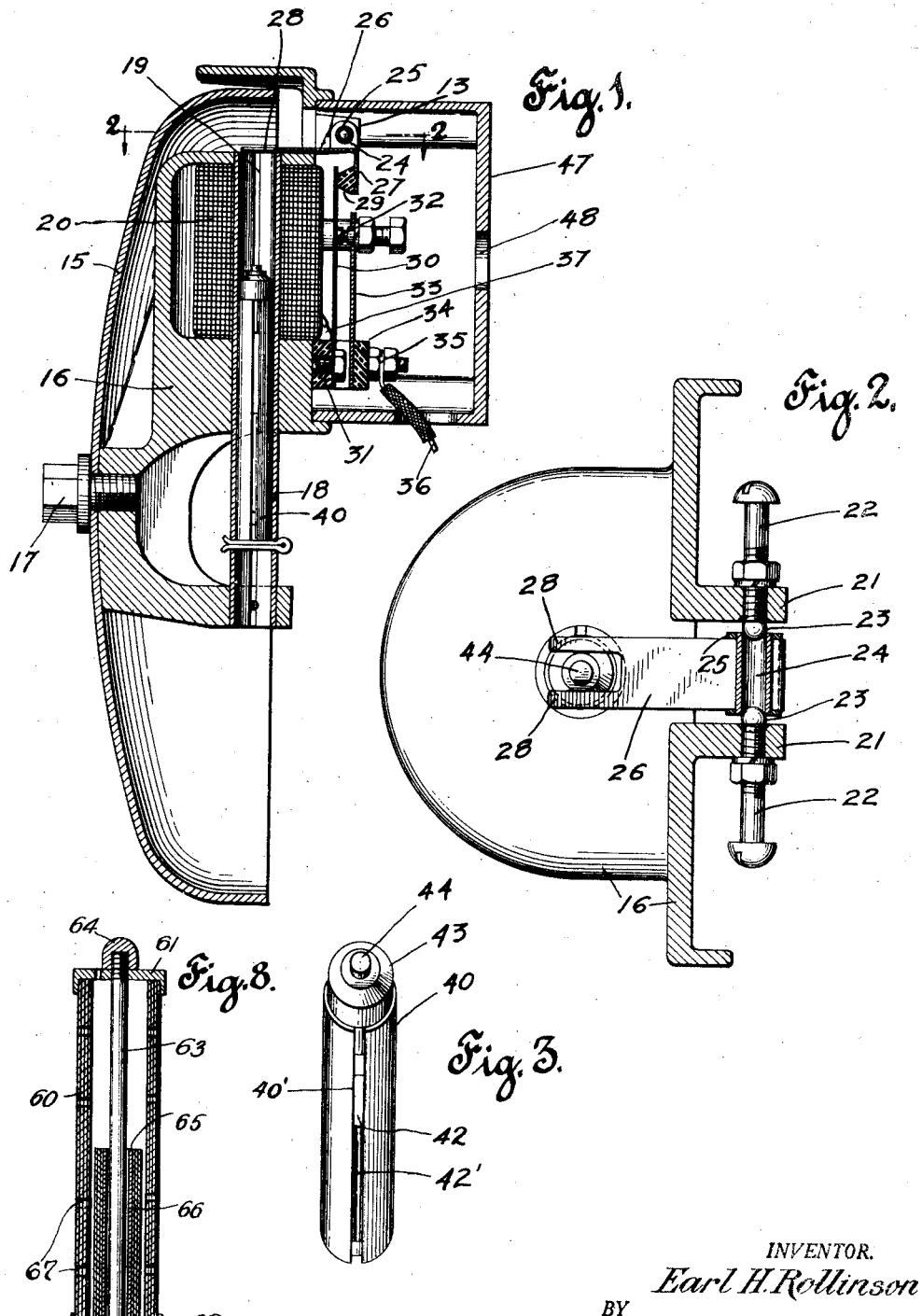
INVENTOR.
Earl H. Rollinson
BY
Warren E. Willis.
ATTORNEY July 1, 1930.  E. H. ROLLINSON  1,769,312
PLUNGER TYPE ELECTRIC BELL
Filed April 23, 1928  2 Sheets-Sheet 2
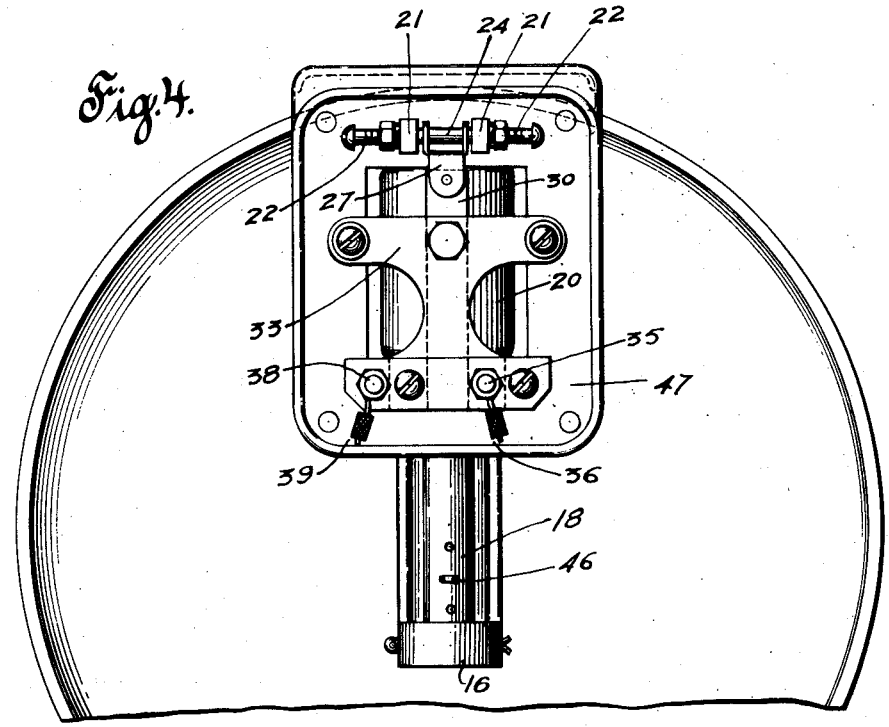
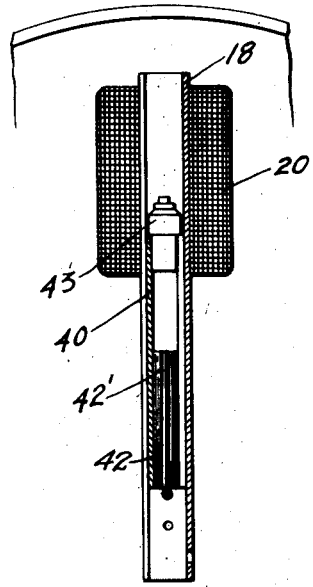
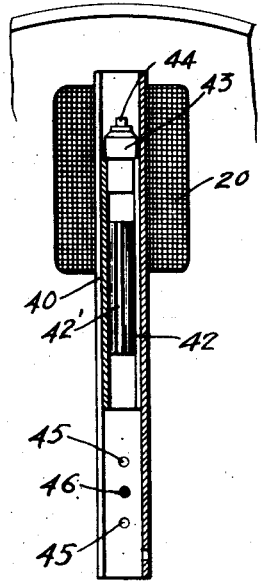
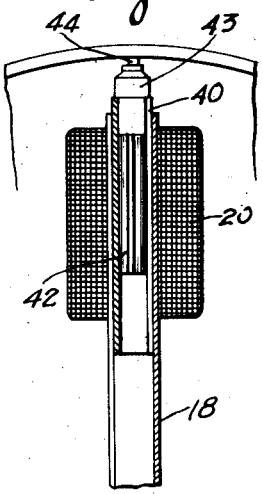
INVENTOR.
Earl H. Rollinson
BY Warren E. Willis.
ATTORNEY Patented July 1, 1930

1,769,312

UNITED STATES PATENT OFFICE

EARL H. ROLLINSON, OF NEWARK, NEW JERSEY

PLUNGER-TYPE ELECTRIC BELL

Application filed April 23, 1928. Serial No. 272,004.

This invention relates to electric bells of the plunger type such as used in municipal service where reliable signals are essential.

Recent requirements for electric bells as reliable signals for use in large municipal fire departments and similar services where many bells are required to operate in series, supervised or in multiple, have demanded certain changes in construction.

Bells for operation on alternating current or direct current circuits are made in many forms, and operate on both battery and power lines.

However, there are many objections to the usual alternating current bell, the main objection being in the single stroke alternating current gong, where eight or ten bells are operated in series, as the plungers occasionally stick. With such a condition the bells are subjected to full operating voltage and the coils are usually burned out due to overload.

A further objection is that expensive laminated cores are required for such bells. These cores are very heavy, for they must be large, as the operation of the bell prevents deep saturation of moving cores, and consequently, about forty percent of the core is dead weight. This excess weight causes the plunger to move slowly and a relatively large amount of power, in the neighborhood of 50 watts, is required to operate such a bell.

My construction allows the rating of a bell in operating voltage and wattage to be made by simple changes in the length of the plungers and windings to produce the desired ampere turns and counter E. M. F. necessary to drive the armature or plunger of the bell.

It is an object of this invention to provide an electric bell having a double plunger with substantially no dead weight, and adapted to provide the necessary counter electromotive force or impedance voltage at the proper time.

A further feature is to provide an electric bell which may be operated with a relatively small amount of power, approximately 7 watts, without detrimental heating effects and independent of line frequency.

Another aim is to provide an electric bell which is cheaper to manufacture, more uniform in operation and more reliable than bells heretofore in use.

These and like objects are attained by the novel construction, combination and arrangement of parts hereinafter described and shown in the accompanying drawings, constituting a material part of this disclosure, and in which:—

Figure 1 is a cross-sectional view of an electric bell, as made in accordance with the invention.

Figure 2 is a partial top plan and sectional view, the section being taken along the line 2—2 of Figure 1, the bell being omitted.

Figure 3 is a perspective view showing the double plunger used in the bell.

Figure 4 is a partial rear plan view of the bell.

Figure 5 is a cross-sectional view, showing the initial position of the double plunger when the solenoid is energized.

Figure 6 is a similar view showing an intermediate position of the plunger as moving to strike the bell.

Figure 7 shows the position of the double plunger at the instant of striking the bell.

Figure 8 is a longitudinal sectional view of another type of double plunger.

Referring in greater detail to the drawings, in Figure 1 a bell 15 is shown to be mounted on a bracket 16 by a threaded bolt 17. Positioned radially in the bracket 16 is a cylindrical tube 18 made of a non-magnetic metal, such as brass or copper, the tube preferably having a longitudinal slot 19 and the upper portion of its length is surrounded by a solenoid 20.

The bracket 16 is provided with a pair of integral, spaced apart lugs 21 serving to receive set screws 22 having their inner ends recessed to accommodate hardened spheres 23, which seat in the ends of a pivot tube 24, passing through ears 25 integral with a sheet metal bell-crank having a horizontal arm 26 and a vertical arm 27. Thus, it will be seen the bell-crank lever is anti-frictionally mounted and can be easily adjusted laterally, as may be desired.

The outer end of the arm 26 is slotted to provide a pair of forks 28, and the arm 27 has attached to it a lug 29 made of insulating material and adapted to engage one end of a flat spring 30, the outer end of the spring being rigidly mounted on the bracket 16 and insulated therefrom by an insulating block 31. The spring 30 is also adapted to engage a contact 32 fixed to a plate 33, the latter being securely mounted on the bracket 16 and insulated from it and the fixed end of the spring 30 by an insulating block 34.

The plate 33 is in engagement with a terminal 35 passing through the block 34, a wire 36 carried by the terminal leading to a source of electrical current being attached to the terminal.

One end of the solenoid 20 is connected to the spring 30 at 37 and the other end is connected to a terminal 38 to which the wire 39 is attached.

Referring to Figure 3, the plunger is shown to comprise an iron or steel tube 40, which may be slotted as at 40' to reduce eddy currents, and an inner plunger 42, made from a piece of soft iron, the inner plunger being also preferably slotted, as at 42', for the same purpose.

Positioned in the under end of the tube 40 is a brass plug 43 which has a reduced hammer portion 44 to strike the bell. In order that the position of the inner plunger may be adjusted, the tube 40 is provided with a number of holes 45 to accommodate a cotter pin 46.

In Figure 8 is shown a modified form of the plunger, in which the slotted tube 40 of Figure 3 is substituted by a tube 60, formed by coiling a sheet of thin magnetic material closely upon itself and caps 61 and 62, coned slightly at their interior surfaces, are provided at the upper and lower ends of the laminated tube to hold the coils in close contact. The plunger tube 60 is provided with a plurality of holes 67 thus permitting flux to enter the edges of the laminations. A guide rod 63 is threaded into the caps to draw them into tight relation with the ends of the coil and mounted on the upper end of the rod is a striker 64. A brass tube 65 slidably surrounds the rod 63 and fixed to the tube 65 is a small plunger 66 formed by coiling a sheet of thin magnetic material about the tube, the same acting in a similar manner to the solid plunger 41.

The inner plunger 42 may also be composed of several sections or wholly replaced by iron balls, tubes, telescopic or otherwise, iron fillings or any other magnetic material.

Mounted on the bracket 16 is a casing 47 which covers certain parts of the device, this casing being provided with an aperture 48 through which a bolt may pass for the purpose of attaching the device to a wall.

In operation, when the solenoid is energized, since about 20% of the plunger tube 40 is in the solenoid, the tube is readily oversaturated and is drawn up into the solenoid with great speed, by the magnetic flux produced by the solenoid. The stored inertia carries the plunger beyond the true electrical center and the plunger strikes the bell. Since this invention is concerned especially with alternating current, the position and volume of the plunger regulates the counter electromotive force or impedance voltage in the solenoid. The impedance voltage increases as the core plunger 42 enters the solenoid and thereby decreases the ampere turns and pull.

The double plunger herein described reduces the initial impedance, as very little iron enters the solenoid and the bell is struck with great speed. At start of the striking movement the ampere-turns of the solenoid will over-saturate the outer tube shell 40 since the iron volume is small, and the over-flux sucks up the core 42, thus increasing the cross-section of iron to normal after the bell has been struck and at the part of the magnetic circuit where it is required to increase the impedance voltage and limit the current passing through the solenoid to a value so that there is no danger of overheating.

As the plunger strikes the bell, the forks 28 on horizontal arm 26 are engaged to rotate the bell-crank and to cause the insulating lug 29 to move the spring 30 inward to break contact with the contact member 32. The circuit is thus interrupted every time the plunger strikes the bell.

The construction allows a time element in vibrating bells, as the contacts of the circuit interrupting device do not open until the plunger strikes the bell at the end of its stroke. The plunger then returns to its lower position and is ready to repeat the operation.

The current interrupting device herein described constitutes a part of the operating mechanism of bells of the vibrating type when used on either alternating or direct current circuits. Single stroke bells do not make use of such a current interrupting device.

The double plunger herein described enables the bell to be operated with a minimum of power, since there is no dead weight to be raised. The rapid initial movement of the plunger is due to the intense influence of the magnetic flux upon the tube 40 and at the time when there is danger of the current through the solenoid becoming excessive, the inner plunger 42 is drawn up into the solenoid to present a greater volume of iron and increase the impedance of the circuit, thus limiting the flow of current.

The double plunger construction allows a very flexible design, as regards power input, tone of the bell and speed of stroke, since all of these qualities may be predetermined by regulating the volume of iron entering the solenoid. This feature is especially important since actual practice shows that simply changing the solenoid winding of a bell is not satisfactory from the standpoint of electrical design and construction.

The foregoing disclosure is to be regarded as descriptive and illustrative only, and not as restrictive or limitative of the invention, of which obviously an embodiment may be constructed, including many modifications, without departing from the general scope herein indicated and denoted in the appended claims.

Having thus described the invention, what is claimed as new and desired to secure by Letters Patent, is:—

1. In a solenoid, a guide tube of non-magnetic material fixed therein, a plunger comprising a tube of magnetic material open at both ends and freely slidable in the guide tube, a stop for said plunger tube and a core of magnetic material freely slidable in said plunger tube.

2. In a solenoid, a plunger movable therein, said plunger comprising a tube formed by coiling a sheet of iron upon itself, caps at the ends of said tube, a rod connecting said caps, and an iron core movable on said rod.

3. In a solenoid, a non-magnetic guide tube passing through said solenoid, an outer plunger composed of sheet iron coils freely movable in said tube and an inner plunger freely slidable in the outer coil, said inner plunger being composed of sheet iron coils, and a striker on the end of said outer plunger.

4. In a solenoid, a non-magnetic tube passing through the solenoid, a laminated hollow cylindrical outer plunger slidable in said tube, said plunger being perforate, caps on said plunger, an axial rod fixed in said caps, said rod carrying a striker, and a laminated core slidable on said rod within the plunger.

5. In a solenoid, a non-magnetic tube passing through the solenoid to extend therebelow, a hollow plunger composed of a plurally coiled strip of sheet iron freely slidable in said tube, said tube having perforate walls, a striker carried by said plunger, an axial guide in the plunger, and an iron core movable on said guide from end to end of said plunger.

In testimony whereof I affix my signature.

EARL H. ROLLINSON.